UNITED STATES PATENT OFFICE.

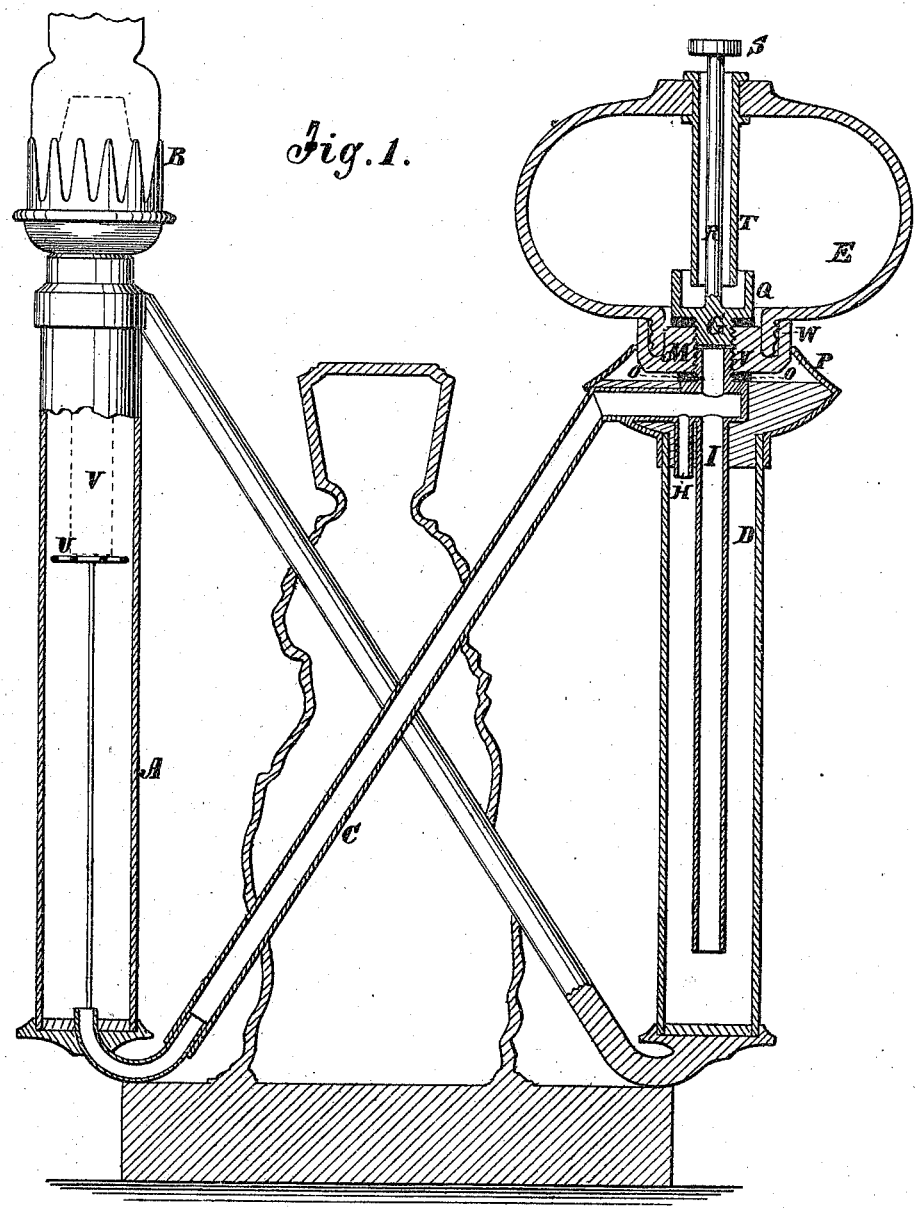

JOHN C. WHARTON, OF NASHVILLE, TENNESSEE.

IMPROVEMENT IN LAMPS.

Specification forming part of Letters Patent No. 142,425, dated September 2, 1873; application filed February 8, 1873.

*To all whom it may concern:*

Be it known that I, JOHN C. WHARTON, of Nashville, in the county of Davidson and State of Tennessee, have invented a new and Improved Lamp, of which the following is a specification:

My invention consists in the construction of a lamp in such manner as to interpose a body of water, or other incombustible fluid, between a small quantity of oil in contact with the wick and the main body of oil contained in a separate reservoir; also, so as to supply the flame automatically with oil from said reservoir through the water to the wick; also, in certain cases, when a more complicated but safer lamp is desired, to isolate the oil contained in a suitable reservoir from all contact with any atmosphere whatever, thus preventing the possibility of ignition within the lamp.

The object is to produce a lamp that shall possess a maximum degree of safety and efficiency as a mineral or other oil lamp, whether using specifically light or heavy oils; at the same time to secure its perfect operation by a scientific yet practical application of hydrostatic principles connected with the difference in specific gravities and the immiscible relation of oil and water, in such a manner as to enable the oil to pass from a reservoir through the water to the burner and supply the flame, while, on the other hand, no flame can pass backward to the reservoir.

Figure 1 is a sectional elevation of an improved lamp constructed according to my invention.

Similar letters of reference indicate corresponding parts.

A is a water-reservoir, with the burner B on the top. It is connected at the bottom by the tube C, which rises nearly as high at its other end as the burner, and connects with the top of a reservoir, D, and the bottom of another one, E, so as to communicate directly with E when the screw-plug G is raised. The reservoir E is attached to the top of D by a screw-threaded hole in the bottom M screwing on the nozzle N, through which passage F is formed, down on a packing-gasket, O, upon a shoulder at the base of the nozzle; and said bottom fits within a drip-cup, P, which receives any leakage from the top of the nozzle when the reservoir E is taken off. The plug G has a cup-shaped head, Q, from the middle of which a stem, R, extends up through the top of the reservoir for use in screwing the plug in and out, and is provided with a thumb-bit, S, by which to turn it. The hole in the top of the reservoir E, through which this stem passes, is enlarged for a vent, and a tube, T, fitting in it oil-tight, extends down into the cup Q. The cup and tube are to prevent the escape through the vent of the fluid with which the reservoir is filled through the hole for plug G when the reservoir is taken off and inverted. This tube has another function, namely, to cause a vacuum in the reservoir E to counteract the weight of the oil or water contained in it, and thus prevent the variation of the height of the column in A by it, except by what may be in the tube T, and that remaining after the level falls below the end of said tube. U, in reservoir A, represents a stand or float for the wick V to rest on to be supported above the water, the level of which will be a little below the stand. The small quantity of oil at the burner will be separated from the main supply by a water-column, and the supply to the burner will be regulated thereby, for, as balance is disturbed by the consumption of oil at the burner, an equal quantity will be supplied from the reservoir. The quantity of oil in the reservoir A will vary a little as that contained in the tube T is exhausted, and the quantity varies in reservoir E after the level falls below the tube, and it will also vary slightly according to whether oil or water is used in reservoir E, owing to the difference in specific gravities; but these variations will only be trifling so long as the outlet C is but a short distance below the tube T. In the construction of the reservoir E, its bottom will, for convenience in fitting in the plug G, be made separate from the main portion, and secured to it at W by screwing in, if made of metal, or by cement, if made of non-metallic substance. The plug G is employed to close the hole in the hollow of reservoir E tight whenever it is to be taken off to be filled.

Having thus described my invention, I claim as new and desire to secure by Letters Patent—

1. The combination of the oil-reservoir E, having vent-tube T, the nozzle N, pipes I H C, and the water-reservoir A, having burner B on top thereof, as and for the purpose described.

2. The plug G and cup Q, applied in connection with reservoir E, as and for the purpose specified.

JOHN CRIDDLE WHARTON.

Witnesses:
A. D. WHARTON,
WM. H. WHARTON.